Aug. 26, 1952  J. M. HAIT  2,608,152
PULL-ROD ROTARY WHOLE CITRUS JUICER

Filed Nov. 13, 1948  5 Sheets-Sheet 1

J. M. HAIT
INVENTOR.

BY

ATTORNEY

J. M. HAIT
INVENTOR.

BY

ATTORNEY

Aug. 26, 1952  J. M. HAIT  2,608,152
PULL-ROD ROTARY WHOLE CITRUS JUICER

Filed Nov. 13, 1948  5 Sheets-Sheet 4

J. M. HAIT
INVENTOR.

BY

ATTORNEY

Aug. 26, 1952 J. M. HAIT 2,608,152
PULL-ROD ROTARY WHOLE CITRUS JUICER
Filed Nov. 13, 1948 5 Sheets-Sheet 5

J. M. HAIT
INVENTOR.

BY
ATTORNEY

Patented Aug. 26, 1952

2,608,152

UNITED STATES PATENT OFFICE 2,608,152

PULL-ROD ROTARY WHOLE CITRUS JUICER

James Merritt Hait, San Jose, Calif., assignor to Food Machinery and Chemical Corporation, San Jose, Calif., a corporation of Delaware Application November 13, 1948, Serial No. 59,801

5 Claims. (Cl. 100—107)

This invention relates to an apparatus for the extraction of liquids such as juice and rind oils from whole fruits and is particularly useful in the extraction of such liquids from citrus fruits. An antecedent extraction apparatus having this general purpose is disclosed in U. S. Letters Patent No. 2,420,679 issued May 20, 1947, to Wilbur A. Pipkin.

It is an object of this invention to provide an improved extraction apparatus operating along the same broad lines as the Pipkin apparatus.

It is another object to provide a machine operating by the Pipkin principle which is inexpensive to build and economical to maintain in service.

The Pipkin principle involves the use of a pair of compression cups, the walls of which are slotted so that the cups have interdigitating relation with each other as they approach so as to enclose and compress a whole fruit, while a means located in one of the cups forms a hole in the rind of the fruit to permit the escape of the juice therefrom as the fruit is compressed. One of the difficulties met with in operating such a machine is that a metal object is sometimes accidentally admitted with the fruit to the space between a pair of these cups. Such an object prevents the cups coming together and results in considerable damage unless provision is made to prevent this.

In said Pipkin patent, the reciprocating cup of each pair is moved through a spring which is supposed to yield, whenever that cup meets excessive resistance, so as to prevent the cup being broken. Because of the high pressure which must be applied in compressing a whole citrus fruit, in the manner above indicated, these springs had to be so stiff that the admission of a solid object to the machine would still cause considerable damage.

It is an object of this invention to provide an extraction apparatus operating by the Pipkin principle and having an improved means for preventing excessive damage being done the machine by the admission of solid objects between the fruit pressing cups.

It is another object of the invention to provide such a machine having a means for immediately halting the operation of this when the pressing cups of one of the pairs thereof come together on a solid object.

In my co-pending application for U. S. Letters Patent, Serial Number 751,158, filed May 28, 1947, on a "Single Whole Fruit Feeder," issued March 7, 1950, as U. S. Letters Patent No. 2,500,030, I disclosed a mechanism for feeding fruit singly to a Pipkin type juice extractor. This feeder includes a disc rotating on a vertical axis within a shallow circular trough the periphery of said disc having openings into which individual pieces of fruit gravitate, each opening moving a piece of fruit into position between one of the pairs of cups on the rotor of the machine to deliver said fruit into the lower of said cups for compression as said cups are subsequently brought together. To operate in this manner the feeder disc must extend between the cups of the compressing units on a rotor. If for any reason these cups are not separated when they arrive opposite the feeder, either the cups or the feeder or both of them are severely damaged by the collision between the upper cup and the feeder.

It is a still further object of the present invention to provide a means for safeguarding against the cups and/or the feeder being damaged severely by collision between these.

In rotary extractors previously produced of the Pipkin type, the compression devices are arranged circumferentially upon a vertical rotor mounted on a central column and the upper end of said column has provided thereon an annular cam which acts upon the upper cup of each pair of these to reciprocate it relative to the other cup to effect the compression of a whole fruit therebetween. This construction offers difficult problems in the supporting of this cam which is necessarily fairly heavy and is subject to high strains in the operation of the fruit compressing units arranged about the rotor.

It is accordingly another object of this invention to provide such a Pipkin type rotary whole fruit juicer with a means for actuating the upper cups of the various pairs of these on the rotor in a manner which will eliminate the aforementioned problems.

The manner of accomplishing the foregoing objects, as well as further objects and advantages will be made manifest in the following description taken in connection with the accompanying drawings in which.

Figure 1:
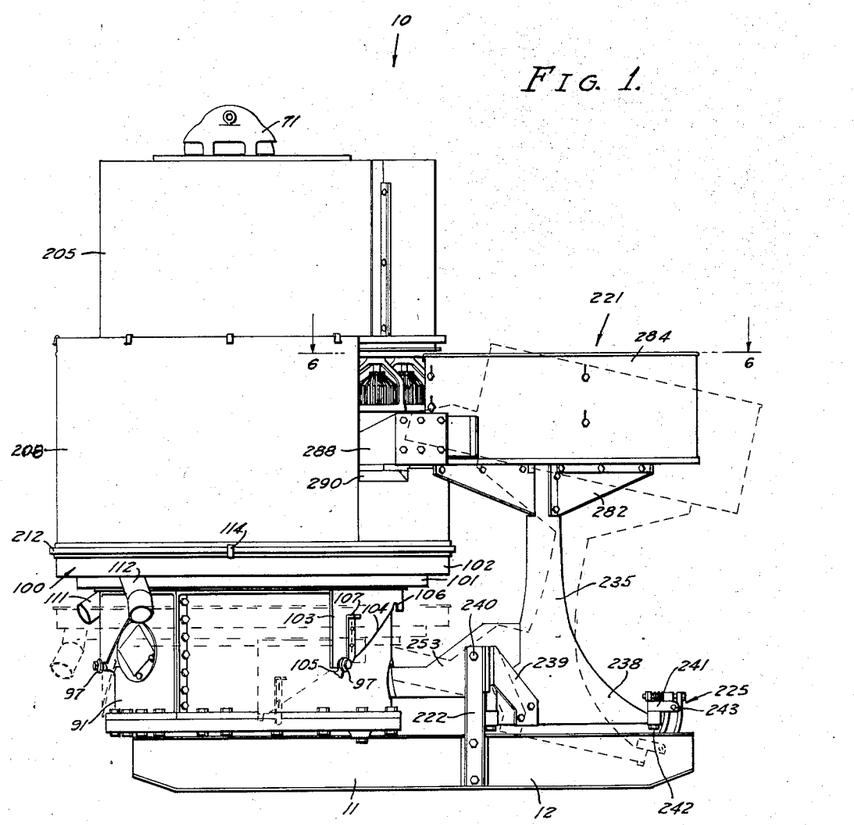
Fig. 1 is a side elevational view of a preferred embodiment of the invention.

Referring specifically to the drawings, Fig. 1 shows a juice extractor 10 having a base 11 comprising I-beam skids 12 connected by channel iron cross members 13, 14, 15 and 16.

Provided on the base 11 is a ring 17 on which is fixed a truncated conical column 18 having an annular flange 19 formed outwardly therefrom which, with the ring 17, is united to the base 11 by screws 20.

The upper end of the column 18 is closed by a wall 25 having an opening 26. Column 18 also has a chain passage 27.

Fixed on the column 18 and extending upwardly therefrom is a super-column 28, having a neck 29 at its upper end on which is supported a thrust and radial bearing 30 and the bore of which provides a bearing for a sleeve 31. The lower end of the super-column 28 is thickened to provide a journal 32. This column also has a window 33 and bearing supports 34 and 35 which contain aligned pairs of bearings 36 and 37.

Rotatively supported within the bearings 36 is a shaft 38 having a pinion 39 formed thereon and having an upwardly extending portion thereof keyed to a sleeve 40. Sleeves 31 and 40 are connected by universal joints 41 and 42 and a telescopic coupling 43.

Mounted rotatably in and supported by the bearings 37 is a sleeve 50 on which is mounted a gear pinion 51 the latter being keyed to said sleeve.

Mounted on the wall 25 so as to be concentric with the opening 26 and the sleeve 50 is a cap plate 52 having a central opening from which a tube 53 extends upwardly, and a depending hollow standard 54 having a bearing 55 at its lower end and a lug 56 extending inwardly therefrom. Fixed onto lug 56 is a bracket 57 on which is supported, concentric with the standard 54, a lubricating oil pump 58 having a drive pinion 59. The standard 54 has an adjustable brace 60 which bears against the inside of column 18 just above passage 27.

Keyed within the sleeve 50 and extending downwardly through the tube 53, the standard 54 and the bearing 55, is a feeder and lubricating pump drive shaft 61. The lower end of this, which is of reduced diameter, has fixed thereon a feeder drive sprocket 65, the latter being connected by pins 66 with the lubricating pump drive pinion 59. Sprocket 65 also has a chain guide disc 67 fixed on the lower face thereof. Rotatably mounted on the bracket 57, in the same radial plane as sprocket 65, are idle sprockets 68 and 69, the purpose of which will be made clear hereinafter.

Mounted on the upper end of the neck 29 is a motor bracket 70 on which is mounted a geared drive motor 71. This motor has a drive shaft 72 which extends downwardly into and has keyed connection with sleeve 31. To prevent oil leaking outwardly between motor 71 and bracket 70, an inverted cup 73 is secured to the motor 71 and extends downwardly with its rim pressed into a rubber seal ring 74 which is nested in the bracket 70.

This bracket also supports a thin sheet metal motor shield 75 which is open at its upper end and has extending therefrom an arm 76 which carries a relay control switch 77 having a switch arm 78 which is responsive to an arm 79 fixed on an upper end of a rod 80 which journals in bearings 81 provided on the arm 76 and a downward extension 82 thereof, to shut off the motor 71. The rod 80 has an arm 83 bent from its lower end which, when engaged so as to rotate the rod 80, actuates the switch 77 so as to halt the motor 71.

Mounted on the annular flange 19 and secured thereto by cap screws 90 is an annular cam 91 having a cam race 92, said cam having an opening 93 which is connected to the opening 27 in the column 18 by a short tube 94, this being covered by a plate 95 having an opening 96 of restricted size.

Fixed on the exterior of the cam 91 and equally spaced thereabout are three liquid-trough-supporting rollers 97.

Mounted on the upper edge of the cam 91 is a concentric pair of labyrinth rings 98.

Figure 2:
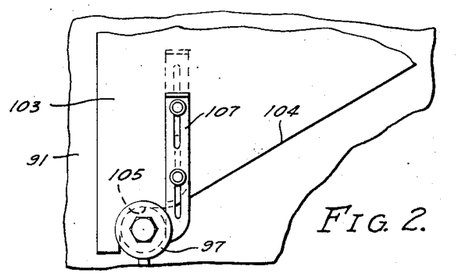
Fig. 2 is an enlarged detail view illustrating a latch employed for maintaining the juice and peel oil trough in its elevated normal operating position and for releasing this, when desired, to permit it to be lowered.
Figure 3:
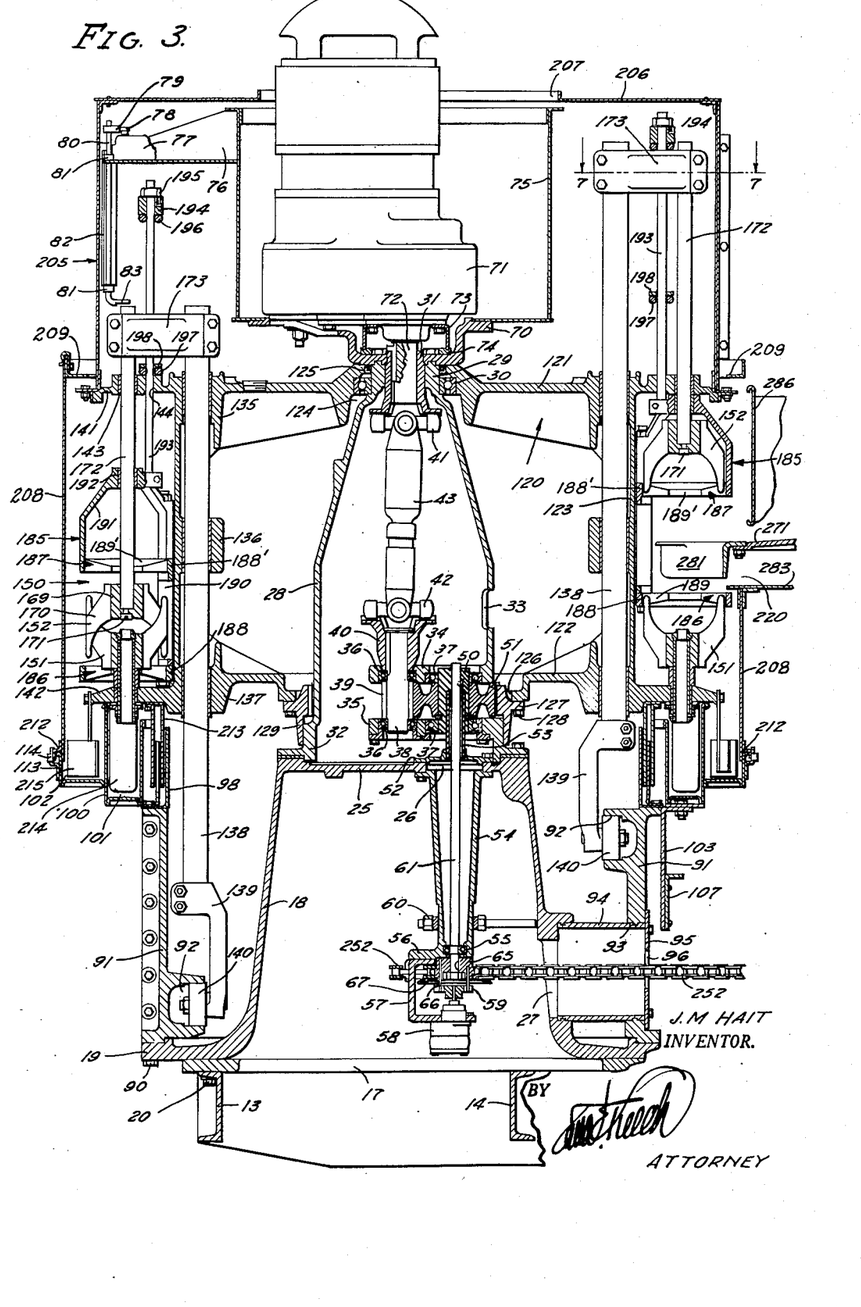
Fig. 3 is a vertical sectional view through the machine shown in Fig. 1 taken on a plane parallel with the paper and containing the axes of the rotor and the feeder of said machine.

Surrounding said labyrinth rings is a double annular trough 100 which includes an inner juice trough 101 and an outer peel oil trough 102 and which has three legs 103 which support the trough 100 by resting upon the rollers 97 (see Figs. 1 and 2). Each of the legs 103 has a sloping cam face 104 which terminates at its lower end in a notch 105 and at its upper end in a notch 106. Provided on one of the legs 103 is a vertically slidable latch 107 which drops by gravity when rollers 97 are disposed in the notches 105 to maintain this relation between said rollers and the legs 103. This operates to hold the trough 100 in its upward position in which it is shown in Figs. 1 and 3.

When it is desired to lower the trough 100, as for cleaning purposes, the latch 107 is lifted and the trough 100 rotated in a clock-wise direction. As the trough rotates, the cam faces 104 travel across the rollers 97 until the latter become lodged in the notches 106. The trough 100 is now in its lowered position as shown in broken lines in Fig. 1.

Outlet spouts 111 and 112 are provided on the juice and peel oil troughs 101 and 102, respectively. The peel oil trough 102 has an outer wall 113 on which are provided spring clips 114, the purpose of which will be made clear hereinafter.

Supported on the bearing 30 and journal 32 is a rotor 120. This rotor is substantially drum shaped, with an upper head 121 united to a lower head 122 by a cylindrical side wall 123. The head 121 provides a central recess 124 in which the bearing 30 is received and is provided with a packing ring 125 which seals off the space between head 121 and the column neck 29 above the bearing 30.

The lower rotor head 122 has a central opening 126 for receiving an internal gear 127 which is secured to said head by cap screws 128. This gear meshes with the drive pinion 51 and has an annular skirt 129 extending downwardly therefrom to provide a bearing which rotatably receives the journal 32.

Vertically aligned pull rod bearings 135, 136 and 137 are provided on the rotor 120 for guiding pull rods 138 on the lower end of each of which roller mount 139 is fixed, this carrying a cam follower roller 140 which travels in the cam race 92 and reciprocates its pull rod 138 vertically with each rotation of the rotor 120. The pull rod on the right side of Fig. 3 is shown in its uppermost position, while the pull rod on the left side of this view is shown in its lowermost position.

The heads 121 and 122 of the rotor 120 have outwardly extending upper and lower flanges 141 and 142 respectively. The flange 141 has a series of eighteen pairs of slide bearings 143 and 144 which are equally spaced circumferentially about the rotor. The flange 142 has a series of eighteen vertical holes 145 formed therein which are in vertical alignment with the bearings 143 in flange 141.

Figure 9:
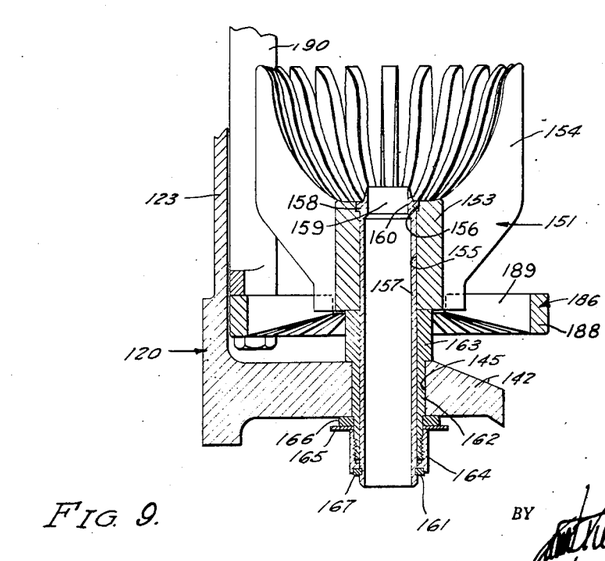
Fig. 9 is a fragmentary enlarged view illustrating one of the lower compression cups of the invention with the carcass stripper in lowered position.

Mounted in each bearing 143 and the hole 145 aligned therewith is one of a series of eighteen fruit compression units 150. Each of the units 150 includes a lower compression cup 151 and an upper compression cup 152. The lower compression cup (see Fig. 9) has a hub 153 from which a series of twenty-five fingers 154 extend radially outwardly, these fingers forming the peripheral wall of the cup 151 and being separated by slots slightly wider than the fingers.

The hub 153 has a bore 155 the upper end of which has a counterbore 156. Fitting into the bore 155 is a juice passage tube 157 having at its upper end a shoulder 158, which fits into the counter-bore 156, and a circular knife 159 having a short throat 160 of somewhat less diameter than the inside diameter of the tube 157. The lower end of the tube 157 has an annular outer recess 161.

The cup 151 is mounted on the flange 142 by means of a sleeve 162 which is snugly received in one of said holes 145, this sleeve having a shoulder 163 which engages the upper face of the flange 142. The lower extending end of the sleeve 162 is further reduced in diameter and threaded to receive a bonnet 164 which bears against a washer 165 to compress between this washer and the flange 142 a rubber ring 166. The lower end of the bonnet 164 is recessed so that after the ring 166 has been sufficiently compressed a split ring 167 may be inserted in the annular recess 161 of the tube 157 and the bonnet 164 then backed away to trap the ring 167 and thus secure the cup 151 in place.

The upper cup 152 of each unit 150 has a hub 169 and a series of fingers 170 formed on said hub to extend radially therefrom and which are separated by slots, said hub, fingers and slots being substantially identical with those of the cup 151 whereby the fingers of the two cups are adapted to have interdigitating relation with each other when the cups are moved axially together as shown on the left side of Fig. 3. The hub 169 fits onto and is secured by a cap screw 171 to the lower end of a push rod 172 the latter having a sliding fit in the corresponding bearing 143 and being united at its upper end with the upper end of the corresponding pull rod 138 by a double clamp 173.

Figure 6:
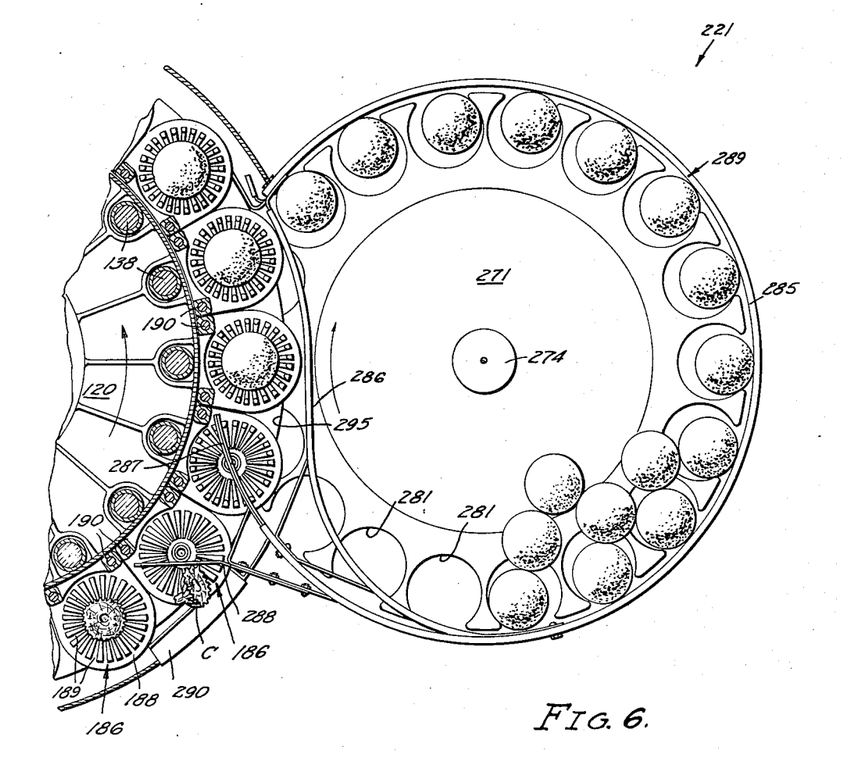
Fig. 6 is a plan view of the feeder of the invention taken on the line 6—6 of Fig. 1 and showing a portion of the rotor of the machine in horizontal section.
Figure 7:
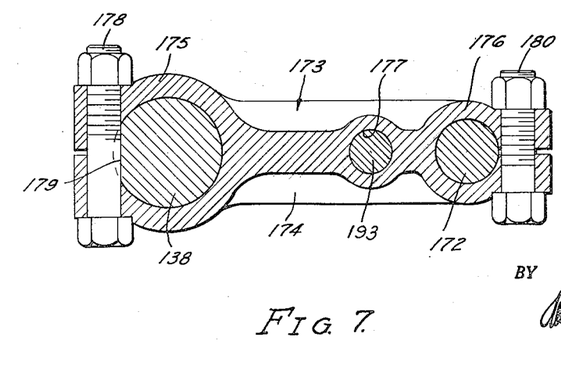
Fig. 7 is an enlarged detail sectional view of one of the pull rod double clamps of the invention, this being taken on line 7—7 of Fig. 3.

As shown in Fig. 6, this clamp comprises a body 174 having a large clamp 175 at one end, a small clamp 176 at the opposite end and an independent vertical hole 177 in between said clamps. The single clamp 175 grips said pull rod 138 and has bolts 178 which fit into recesses 179 in said pull rod so as to unite the double clamp 173 with said pull rod in non-slipping and non-rotatable relation therewith.

Clamp 176 receives the pusher rod 172 and has bolts 180 which are adjustable so as to vary the friction between the clamp 176 and said push rod. Thus the amount of pressure which it will take to cause slippage of the push rod 172 in the clamp 176 may be accurately predetermined in terms of the amount of torque with which the bolts 180 are tightened with a torque wrench.

Each of the compression units 150 has a fruit carcass stripping mechanism 185. This embodies a lower cup stripper 186 and an upper cup stripper 187. Stripper 186 comprises a ring 188 from which a number of picks 189 equal in number to the fingers of the respective cups with which these strippers are associated, extend inwardly radially from the ring 188. Stripper 187 comprises a similar ring 188' and picks 189', so that the strippers may by-pass said cups with the picks 189 and 189' sliding in the slots between the fingers of said cups.

The strippers 186 and 187 are united by vertical tie-bars 190, and stripper 187 is connected by a spider 191 to a hub 192 which slidably receives the push rod 172 and has connected thereto a vertical operating rod 193 which extends slidably through the adjacent bore 144 in the rotor flange 141 and through the hole 177 in the double clamp 173 associated therewith. At its upper end, the rod 193 is threaded and has screwed thereon a lift block 194 the position of which on the rod is fixed by a lock nut 195. Contracted about the rod 193 so as to remain in position just below the block 194 is a rubber ring 196. Similarly applied to this rod between the flange 141 and double clamp 173 is a rubber ring 197 on top of which is placed a washer 198.

A cylindrical cover 205 for the space above the flange 141 is secured to the outer edge of the flange 141 and rotates therewith. This cover has a top plate 206 with a central opening 207.

A stationary cylindrical cover 208 is formed of light sheet metal to surround the area in which the compression units 150 operate as the rotor 120 rotates. This cover has an inturned flange 209 held on its upper edge by spring clips 210 said flange overlying the outer edge of the flange 141. At its lower edge cover 208 has a grooved bead 212 which receives the upper edge of the trough wall 113 (see Fig. 3) and is releasably held thereon by spring clips 114 so that the cover 208 is normally supported on said wall.

Fixed on the lower rotor flange 142 is a pair of labyrinth flanges 213 which intermesh with the labyrinth flanges 98 on the cam 91 so as to prevent juice or peel oil having access to the space between the cam 91 and column 18 within which it is desired to maintain a supply of lubricant.

Also mounted on the rotor flange 142 and extending downwardly into the juice and peel oil troughs 101 and 102 respectively, is a juice pulp plow 214 and a peel oil plow 215. As the rotor rotates, these plows keep juice and peel oil pulp distributed and move it around to where it is washed from these troughs through the outlet spouts 111 and 112.

On the side of the machine where the pull rods 138 are disposed upwardly, an opening 220 is formed in the cylindrical cover 208 to make room for the mounting of a feeder 221 for feeding whole citrus fruit individually to the compression units 150 as these come around successively opposite said feeder.

The mounting for said feeder includes a pair of posts 222 fixed on opposite sides of the base 11 and rising upwardly therefrom, only one of said posts being shown in Fig. 1. It also includes a bracket 223 extending inwardly from the channel bar 16 (see Fig. 4) and having a pivot pin 224 on which the lower end of an arcuate spring clamp 225 is pivoted. This clamp has a pair of arcuate jaws 226 and 227 which are provided with opposed notches 228, said jaws being held together by a spring 229 and bolt 230. Also provided between said jaws, just below the notches 228, is a relatively long arcuate free space 231.

Feeder 221 includes a hollow cast standard 235 having a neck 236 at its upper end, supporting a bearing 237, and a flared base 238 at its lower end, said base having arms 239 (see Fig. 1) which are pivotally connected by bolts 240 to upper ends of posts 222.

Figure 4:
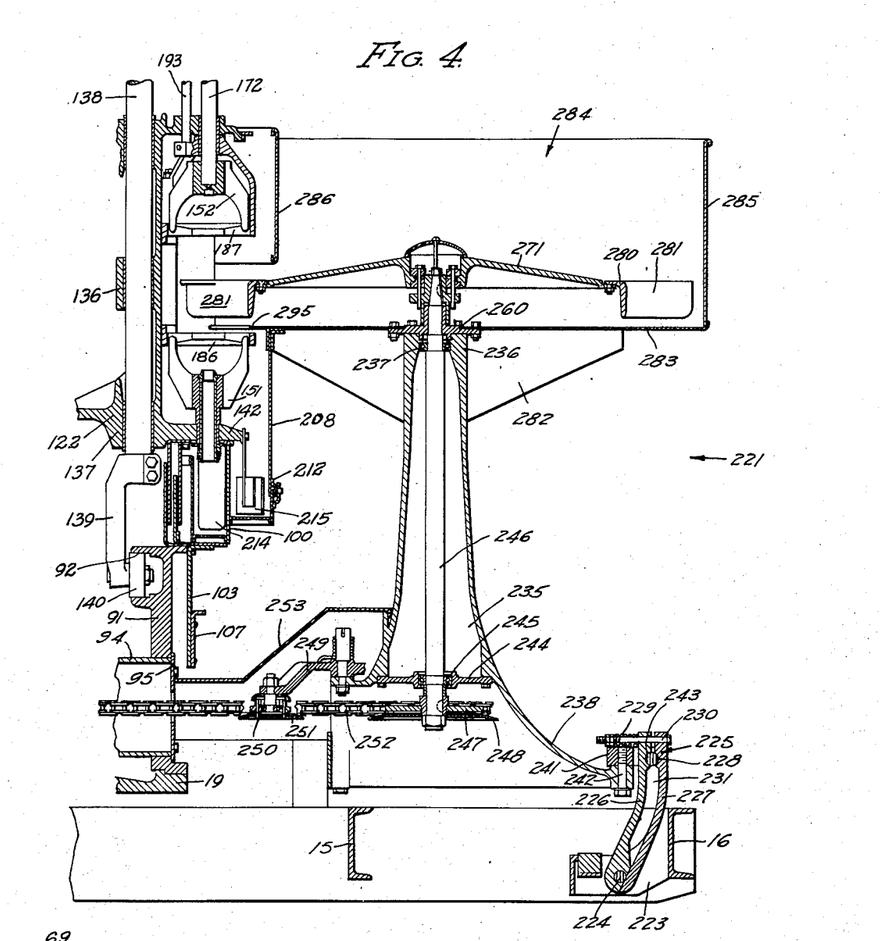
Fig. 4 is a view supplementary to Fig. 3, at the same scale, and taken on the same plane, and illustrates the feeder of the invention.

At its outer extremity the standard base 238 has a yoke 241 connected thereto by bolt 242, the arms of said yoke being connected by pin 243 which extends between the clamp jaws 226 and 227 and is normally located within the notches 228 and gripped by the jaws so as to be held firmly in the position in which it is shown in Fig. 4, by the pressure of spring 229.

Figure 5:
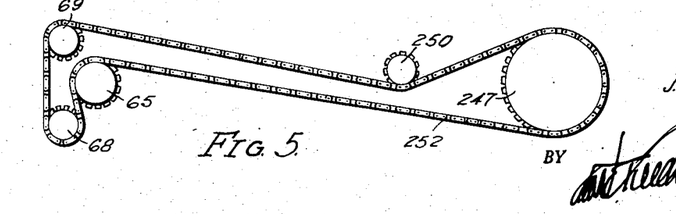
Fig. 5 is a diagrammatic plan view of the chain and sprocket feeder drive mechanism of the invention.

The standard 235 has a bearing plate 244 supporting a bearing 245, a vertical feeder shaft 246 being rotatably supported in bearings 237 and 245. Mounted on the lower end of the shaft 246 is a sprocket 247 and a chain guide disc 248. Pivotally mounted on the standard 235 is a spring biased idler arm 249 having an idler sprocket 250 which also has a chain guide disc 251. Trained about the sprockets 65, 68, 69, and 247 and meshing with the sprocket 250 (see Fig. 5) is a feeder drive chain 252 which is kept taut by pressure of the sprocket 250 thereagainst.

Provided on the standard 235 is a sheet metal chain housing 253 which extends up to plate 95.

Figure 8:
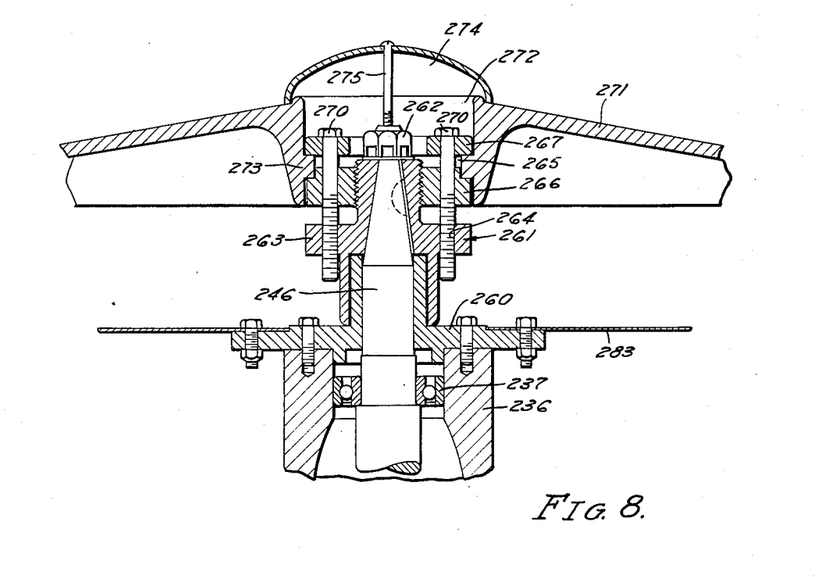
Fig. 8 is an enlarged fragmentary view of a portion of Fig. 4 showing the construction of the mounting of the feeder disc.

Secured upon the upper end of the standard 235 is a cap 260 (see Fig. 8) which provides a supplementary bearing for the upper end of shaft 246, the latter being tapered to receive a feeder disc hub 261 which is keyed thereto. The upper extremity of the shaft 246 is threaded to receive a nut 262 which retains the hub 261 in place. This hub is threaded and has a flange 263 in which are provided threaded holes 264.

An adjustable feeder disc clamp 265 is provided on said hub. This comprises a lower ring 266 which is adapted to be screwed onto the hub 261 and a ring 267, these rings having holes corresponding in their spacing to the holes 264 in the flange 263 and being adapted to receive bolts 270 which extend slideably through the rings 267 and 266, and are threadedly received in the holes 264 in the flange 263. A feeder disc 271 having a central opening 272, from the wall of which an annular flange 273 extends inwardly, is adjustably secured to the hub 261 by the clamp 265 clamping the flange 273 between the lower and upper rings 266 and 267.

An adjustment in height of the feeder disc 271 to accommodate varying sizes of fruit is accomplished by removing the bolts 270, screwing the ring 266 upwardly or downwardly on the hub 261 and replacing the bolts 270 so as to re-clamp the disc 271 on the hub 261. The central opening 222 is normally covered by a sheet metal cap 274 held in place by a screw 275 screwed into a suitable tapped hole provided in the upper extremity of the shaft 246.

Feeder disc 271 slopes downwardly from its center toward the periphery thereof where it is provided with a replaceable fruit feeding ring 280 having a series of circumferentially spaced fruit receiving openings 281 each of which is adapted to feed a single piece of fruit.

Mounted on the cap 260 and braced from the standard 235 by gussets 282 is a floor 283 of a shallow cylindrical feeder hopper 284. This hopper has a side wall 285 which extends upwardly from the periphery of the floor 283 and has secured thereto a deflecting or shear wall 286 which is shaped as shown in Fig. 6 and which closely overlies the ring 280 so as to prevent more than one piece of fruit being fed at a time to the machine by a single opening 281.

The rotor 120 and feeder disc 271 rotate in the directions indicated by the arrows in Fig. 6 and the side wall 285 is extended alongside the path along which the fruit is thus fed by the openings 281, to form a guide 287.

Also mounted on the wall 285 and extending in the opposite direction into the space between the separated compression cups of the units 150 is a carcass shear blade 288 which shears fruit carcasses C from off the lower strippers 186 as these successively move past this blade as shown in Fig. 6. A ramp 290 is formed inwardly from the lower edge of the opening 220 in the cylindrical cover 210 to guide the carcasses C out of the machine as they are sheared from the stripper 186.

*Operation*

Provisions having been made for feeding whole citrus fruit of a suitable size, such as oranges F, to the feeder hopper 285, the motor 71 is started, which turns the rotor 120 through the pinions 39 and 51 and the internal gear 127. Rotation of the rotor produces through the rising and lowering of rollers 140 as they travel along the cam race 92, a reciprocation of the pull rods 138. This not only moves the push rods 172 and the upper cups 152 mounted thereon up and down between their lower positions as shown at the left of Fig. 3 and their upper positions as shown at the right of Fig. 3, but it shifts the stripper mechanism 185 of each unit 150 into its downwardmost position as shown at the left of Fig. 3 when the upper cup is down and shifts this mechanism to its uppermost position when the upper cup is up as shown at the right side of Fig. 3.

There is a lag, however, between the vertical movements of the upper cup and vertical movements in the same respective directions of the corresponding carcass stripper mechanism. For instance, when the upper cup starts upward from its lower position it moves entirely through the upper stripper 187 before the stripper mechanism starts upwardly. From this point on, the upper cup and stripper rise together until they both reach their uppermost positions as shown at the right of Fig. 3.

The return downward of said upper cup and the corresponding carcass stripping mechanism is a mere reversal of the manner in which these were lifted. In other words, they both return downward together until the carcass stripper mechanism has reached its lowermost position after which the upper cup continues down to its lowermost position. This causes the lower stripper 186 to be approximately at the level of the cutter 159 at the time a whole fruit is fed into the lower cup with which it is associated.

The effect upon a whole citrus fruit while it is being compressed between the cups 151 and 152 in the machine 10 is substantially as illustrated and described in said Pipkin patent. That is to say, a button is cut from the rind of the fruit by the cutter 159 and this button and the juice from the interior of the fruit is discharged downwardly through the throat 160 and the juice passage tube 157 into the annular juice trough 101 from which it passes through the spout 111 into a container provided to receive the same.

The collapsed rind of the fruit left between the cups is referred to as a fruit carcass. This normally is left in the lower cup as the upper cup rises but should it adhere to the latter, it is stripped therefrom as the upper cup passes upwardly through the upper stripper 187. In such a case it falls downwardly into the lower cup 151 and in any event it is stripped upwardly from this cup by the rising of the lower stripper 186, which terminates with the lower stripper positioned as shown on the right side of Fig. 3, in which position said stripper passes underneath the carcass shear blade 288 which shears the carcass outwardly from over the stripper as shown in Fig. 6.

The feeder hopper floor 283 supports fruit resting in the feeder disc openings 281 while the fruit is being advanced by the rotation of this disc towards the position where it will be fed downwardly into one of the lower cups 151. This floor is cut away at 295 to permit the fruit to drop as it comes over said cup.

Attention is directed to the plan contour of the shear blade 286 as shown in Fig. 6. The gradual cam-like action of this blade on fruit superimposed above the pieces resting in the openings 281 results in such an efficient shearing of this excess fruit away from over the said openings as to permit the feeder 221 to operate with a relatively low power consumption.

It is to be noted that one of the heaviest elements of the machine, to-wit: the cam 91, is mounted directly on the base 11. This permits a much lighter superstructure than was formerly needed when the cam was located at the top of the machine. It is also to be noted that the high point in the cam race 92 is located directly opposite the place where the feeding operation takes place, thereby providing an opportunity for piercing the cam to form a passageway for the feeder drive chain 252.

As shown on the left side of Fig. 3, the upper end of each of the push rods 172 when it has pushed the upper cup 152 mounted thereon into its lowermost position, passes just below the arm 83, on the switch-actuated rod 80 which when rotated causes the switch 77 to stop the motor 71. Such rotation of the rod 80 takes place, however, only when a solid object accidentally gains access to the space between the compression cups of one of the units 150 so that this object resists the downward movement of the upper cup 152 thereof and prevents this cup traveling completely downwardly. This results in the push rod 172 of this cup resisting downward movement to the point where the clamp 176 slides on said rod 172, leaving the upper end of the latter extending above the level at which it is shown on the left side of Fig. 3, so that instead of passing under the arm 83, as there shown, it engages this arm, swings the rod 80, actuates the switch 77 and stops the motor 71.

It has been found to be a practical procedure, that by tightening the bolts 180 to a torque of a given value, the amount of pressure that it will take to cause slippage between the push rod 172 and its clamp 176 can be so accurately determined that such slippage will not occur during normal operations of the machine (although a pressure of substantially 800 to 1200 pounds is required in the compression of a whole citrus fruit by one of the units 150) and yet such slippage will occur when a solid object gains admission accidently to one of the compression units so as to prevent serious damage to the cups of said unit.

When such an accident occurs and a solid object such as a piece of metal is admitted into a compression unit 150, the cutter 159 thereof, being fragile, is, of course, practically destroyed. Owing to the ease with which the lower cup 151 is assembled upon the rotor flange 142 (see Fig. 9), the juice passage tube 157 on which the cutter is mounted may be readily replaced in the machine when one of these is thus damaged, and since the lower cup 151 is entirely separated from the machine when changing the tube 157, this cup may be likewise replaced with no additional time loss in case it has been damaged by said accident.

Replacing of one of the upper cups 152 when this is damaged may be just as readily accomplished by the removal of the cap screw 171 holding said cup onto the lower end of its push rod 172.

In case of a jam or collision between the rotor 120 and the feeder disc 271, as would happen if a stripper mechanism 185 or an upper cup 152 were to remain lowered when arriving opposite said feeder disc, the downward pressure thus brought to bear on the pin 243 separates the jaws 226 and 227 against the action of the spring 229 thus admitting pin 243 to the space 231. As this space is formed about a radius from the axis of bolts 240, the pin 243 is now free to move clear to the bottom of the space 231 thus allowing the feeder 221 to swing about the bolts 240 from the full line position in which this is shown in Fig. 1 to the broken line position in which it is there shown. By this expedient, excessive damage to either the feeder 221 or the rotor 120 and compression units 150 carried thereby, is prevented.

When the cause of such collision between the rotor and the feeder is eliminated and the damage repaired, the feeder 221 is restored to its original operative position by swinging this upwardly to return the pin 243 to its normal position where it is clamped in place between the two notches 228 of the clamp 225 as shown in Fig. 4.

As already indicated, the double trough 100 is supported in a manner to be readily lowered into a broken line position in which this is shown in Fig. 1 whenever this is desirable, as for cleaning purposes at the end of a run. When the double trough 100 is thus lowered, the flange 211 comes to rest on the outer edge of the rotor flange 141 so as to support the cylindrical cover 210 causing the outer wall 113 of the peel oil trough 102 to be withdrawn from the grooved bead 212 of said cover. The covers 205 and 210 are both constructed, of course, so that they may be readily removed from the machine when desired.

The chain guide flanges 67, 248 and 251 are to prevent the chain 252 getting out of mesh with any of the sprockets of the feeder drive mechanism when the feeder is tilted about the axis of the bolts 240 during an emergency as above described. Thus at the end of such an emergency when the feeder is tilted back to a level position, The chain 252 is still in mesh with the various sprockets about which it is trained, and the feeder drive mechanism is again ready to function.

The claims are:

1. In combination: a base; a column extending upwardly therefrom; a rotor rotatably mounted on said column; a series of whole fruit compression units arranged circumferentially upon said rotor, each of said units having a cup fixed on said rotor and a cup reciprocable relative to said fixed cup to compress a whole citrus fruit; a cam mounted on said base beneath said rotor, said cam having an endless race which, viewed in plan, is concentric with the axis of rotation of said rotor; cam follower rollers, one for each of said units; pull rods, one for each of said units, each rod carrying one of said rollers and being slideably mounted on said rotor, said rods extending upwardly from their rollers past and above their respective units; push rods slideably mounted on said rotor parallel with said pull rods, the reciprocable cup of each unit being carried on one of said push rods; and friction clamps, each of which is mounted on one of said pull rods and grips a corresponding one of said push rods.

2. In combination: a base; a column extending upwardly therefrom; a rotor rotatably mounted on said column; a series of whole fruit compression units arranged circumferentially upon said rotor, each of said units having a cup fixed on said rotor and a cup reciprocable relative to said fixed cup to compress a whole citrus fruit; a cam mounted on said base beneath said rotor, said cam having an endless race which, viewed in plan, is concentric with the axis of rotation of said rotor; cam follower rollers, one for each of said units; a series of vertical cam follower rods, one for each of said units, each of said rods carrying one of said rollers and being slideably mounted on said rotor; a series of cup mounting rods, one for each of said units, the reciprocable cup of each unit being carried on the mounting rod for that unit; and a series of friction clamps each of which is mounted on one of said cam follower rods and the corresponding cup mounting rod to grip and frictionally unite said rods with a degree of friction which will resist relative movement between said rods under all pressures required for the normal operation of said units but which will yield and allow such movement upon the cups of a unit closing upon an unyielding object.

3. In combination: a base; a rotor rotatably mounted thereon on a vertical axis; a series of whole fruit compression units disposed circumferentially about said rotor; means for operating said units while said rotor rotates; a bodily movable feeder including a rotary disc having peripheral openings for feeding whole fruit to said units and extending into said units to deliver fruit thereto; a mounting for said feeder holding said feeder in said inwardly extended position; and a yieldable device in said feeder mounting, said device being responsive to an abnormal force, applied outwardly against said feeder, to yield, thereby releasing said feeder and causing it to yield outwardly from its normal position extending into said units.

4. In combination; a base, a rotor mounted to rotate on a vertical axis on said base; a series of whole fruit squeezing units provided on said rotor about the periphery thereof; means for rotating said rotor; means for actuating said squeezing units as said rotor rotates; an annular trough surrounding said base beneath said units to receive liquid extracted by said units from said fruit; a set of three helical cams; a set of three rollers, one of said sets being mounted on said trough in spaced circumferential relation, the other of said sets being mounted in similar spaced relation on said base so that said rollers and cams coact to support said trough on said base and cause said trough to rise or be lowered when rotated; and means for releasably locking said trough against rotation when in its elevated position.

5. A combination as in claim 4 in which said locking means comprises a lug on one end of one of said cams and a latch on said cam optionally operative to trap the roller associated with said cam between said lug and said latch.

JAMES MERRITT HAIT.

REFERENCES CITED

The following references are of record in the file of this patent:

UNITED STATES PATENTS

| Number | Name | Date |
|---|---|---|
| 1,479,173 | Harvey | Jan. 1, 1924 |
| 1,996,849 | Bauer | Apr. 9, 1935 |
| 2,420,679 | Pipkin | May 20, 1947 |